United States Patent
Hirata et al.

(10) Patent No.: US 12,073,857 B1
(45) Date of Patent: Aug. 27, 2024

(54) PERPENDICULAR MAGNETIC RECORDING HEAD EQUIPPING A SPIN TORQUE OSCILLATOR ELEMENT WITH AN ELECTRIC CURRENT IN SIDE GAPS

(71) Applicant: Headway Technologies, Inc., Milpitas, CA (US)

(72) Inventors: Kei Hirata, Sunnyvale, CA (US); Kowang Liu, Fremont, CA (US); Yue Liu, Fremont, CA (US); Jiun-Ting Lee, Sunnyvale, CA (US); Weihao Xu, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/110,347

(22) Filed: Feb. 15, 2023

(51) Int. Cl.
*G11B 5/11* (2006.01)

(52) U.S. Cl.
CPC .................................. *G11B 5/11* (2013.01)

(58) Field of Classification Search
None
See application file for complete search history.

(56) References Cited

U.S. PATENT DOCUMENTS

| | | | |
|---|---|---|---|
| 8,107,352 B1 * | 1/2012 | Yamanaka | G11B 5/1278 360/125.02 |
| 8,861,137 B1 * | 10/2014 | Lam | G11B 5/1278 216/22 |
| 10,014,012 B1 * | 7/2018 | Song | G11B 5/315 |
| 10,679,650 B2 | 6/2020 | Bai et al. | |
| 10,699,734 B2 | 6/2020 | Bai et al. | |
| 10,957,348 B2 | 3/2021 | Bai et al. | |
| 2009/0080120 A1 * | 3/2009 | Funayama | G11B 5/02 360/313 |
| 2014/0177100 A1 * | 6/2014 | Sugiyama | G11B 5/1278 360/125.03 |
| 2014/0313616 A1 * | 10/2014 | Kusukawa | G11B 5/187 360/125.03 |
| 2015/0043106 A1 * | 2/2015 | Yamada | G11B 5/1278 360/123.05 |
| 2017/0053668 A1 * | 2/2017 | Hixson-Goldsmith | G11B 5/3163 |
| 2019/0251992 A1 * | 8/2019 | Ho | G11B 5/235 |

* cited by examiner

*Primary Examiner* — William J Klimowicz
(74) *Attorney, Agent, or Firm* — DLA Piper LLP (US)

(57) ABSTRACT

The present embodiments relate to a perpendicular magnetic recording (PMR) write head with an STO element and configured to direct an electric current between elements of the write head. A first example embodiment describes a perpendicular magnetic recording (PMR) write head. The PMR write head can include a main pole comprising a tip portion disposed adjacent to an air bearing surface (ABS) and is configured to interact with a magnetic recording medium. The PMR write head can also include a spin torque oscillator (STO) element disposed adjacent to the main pole. The PMR write head can also include a side shield layer with a portion of the side shield layer disposed adjacent to the ABS. The PMR write head can also include a metallic side gap layer disposed between the main pole and the side shield layer.

12 Claims, 19 Drawing Sheets

PERPENDICULAR MAGNETIC RECORDING HEAD EQUIPPING A SPIN TORQUE OSCILLATOR ELEMENT WITH AN ELECTRIC CURRENT IN SIDE GAPS

TECHNICAL FIELD

Embodiments of the invention relate to the field of electro-mechanical data storage devices. More particularly, embodiments of the invention relate to the field of perpendicular magnetic recording (PMR) write heads including a spin torque oscillator (STO) element.

BACKGROUND

A hard-disk drive (HDD) can include a non-volatile storage device that is housed in a protective enclosure and stores digitally encoded data on one or more circular disks having magnetic surfaces (a disk may also be referred to as a platter). When an HDD is in operation, each magnetic-recording disk can be rapidly rotated by a spindle system. Data can be written to a magnetic-recording disk using a write head which is positioned over a specific location of a disk. A write head can use a magnetic field to write data to the surface of a magnetic-recording disk.

In many cases, a write head can implement perpendicular magnetic recording (PMR) to interact with a magnetic recording medium (e.g., a disk). With PMR-based write heads, a bit magnetization of a magnetic recording layer in the disk can be directed perpendicular to the surface of the disk. The alignment of magnetization of the bits in the disk can allow for higher storage densities on the disk.

SUMMARY

The present embodiments relate to a perpendicular magnetic recording (PMR) write head with an STO element and configured to direct an electric current between elements of the write head. A first example embodiment describes a perpendicular magnetic recording (PMR) write head. The PMR write head can include a main pole comprising a tip portion disposed adjacent to an air bearing surface (ABS) and is configured to interact with a magnetic recording medium.

The PMR write head can also include a spin torque oscillator (STO) element disposed adjacent to the main pole. The PMR write head can also include a side shield layer with a portion of the side shield layer disposed adjacent to the ABS. The PMR write head can also include a metallic side gap layer disposed between the main pole and the side shield layer.

In another example embodiment, a write head is described. The write head can include a main pole comprising a tip portion disposed adjacent to an air bearing surface (ABS) and is configured to interact with a magnetic recording medium. The write head can also include a spin torque oscillator (STO) element disposed adjacent to the main pole. A portion of the STO element can be disposed adjacent to the ABS. The write head can also include a side shield layer with a portion of the side shield layer disposed adjacent to the ABS. The write head can also include a metallic side gap layer disposed between the main pole and the side shield layer. The write head can also include an insulation layer disposed between the metallic side gap layer and the main pole.

In another example embodiment, a system is described. The system can include a main pole comprising a tip portion disposed adjacent to an air bearing surface (ABS) and is configured to interact with a magnetic recording medium. The system can also include a spin torque oscillator (STO) element disposed adjacent to the main pole, wherein a portion of the STO element is disposed adjacent to the ABS. The system can also include a side shield layer with a portion of the side shield layer disposed adjacent to the ABS. The system can also include a metallic side gap layer disposed between the main pole and the side shield layer. The system can also include an insulation layer disposed between the metallic side gap layer and the side shield layer, wherein only a portion of the metallic side gap layer is in direct contact with the side shield layer.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1A:
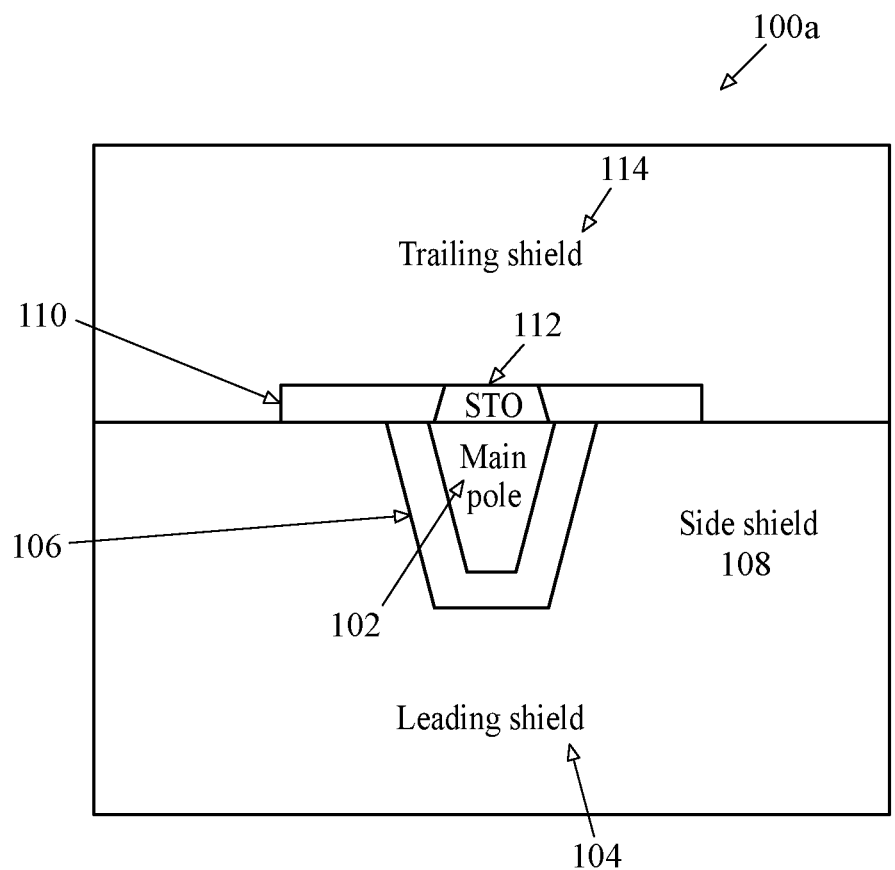
FIG. 1A is a cross-section view of a PMR write head according to an embodiment.

To enhance an areal recording density of a hard disk drive (HDD), the write head of the HDD can have an increased write field magnitude and an increased field gradient. In some instances, to achieve such metrics, a perpendicular magnetic recording (PMR) can include a spin torque oscillator element on top of a main pole to increase a write field magnitude and a write field gradient. Such a head can be known as a microwave assist magnetic recording (MAMR) head.

A microwave element can emit a field from the STO element by spin torque oscillation, which can assist in recording media magnetization switching by increasing write field magnetization and write field gradient for an improved kilo flux change per inch (kFCI). The STO element can obtain a magnetic field and electrical current in order to obtain the spin oscillation in the STO element. Further, the STO element can reside on the main pole and connected to a direct current (DC) current source.

In addition to the magnetic field assist effect by STO spin oscillation in the STO element, the magnetic field induced by a DC current can also increase recording performance of the write head. Particularly, electrical current can be directed through the main pole to a side shield or from the side shield to the main pole. This can be referred to as a magnetic assist current (MAC). The magnetic field generated from the MAC can distribute around the main pole, which can assist in switching the recording media magnetization, magnetization of writer main pole, and magnetization of a writer shield component. To achieve the MAC effect, the side gap and main pole can be electrically connected to a metallic side gap (SG).

In the present embodiments, a confined current path can be used to improve MAC efficiency, which can relate to a MAC electrical current density being sufficiently high to improve the MAC efficiency for enhancing kFCI. The confined MAC current path can have a relationship between a MAC current magnitude and kTPI performance. For instance, a higher MAC current magnitude can improve kFCI, but a kilo track per inch (kTPI) can drop due to a magnetic erase width (EWAC) expansion due to a stronger current-induced magnetic field around the main pole. A confined MAC path can reduce the MAC assist current to obtain an equivalent kFCI gain, which can allow for a higher areal density capability (ADC) gain by balancing kTPI and kFCI. In the present embodiments, a MAC current can use between 10 and 20 mA to obtain the ADC gain. A current below a lower threshold may not improve kFCI, while a current above an upper threshold can lose kTPI performance.

In addition to a MAC current confinement, the STO and MAC current path can be electrically connected with parallel electrical circuit paths. For instance, the STO element can be connected between the main pole and a trailing shield, with the STO current flowing through from main pole to the trailing shield via the STO element, and vice versa. The MAC current can go through from main pole to side shield and the leading shield, and vice versa. With a parallel circuit, the electrical current can split according to a resistance magnitude of both the STO and the MAC path. In the present embodiments, a current density can be more than $10^8$ A/cm2 at the STO element to generate a spin oscillation in the STO element, which can correspond to around a 2 mA current into the STO path. Therefore, the STO element resistance and the MAC element resistance can balance appropriately to obtain a current magnitude for both the STO element and the MAC element.

The present embodiments relate to writer designs and control methods to achieve a confined current path for a MAC while keeping the appropriate assist current for a STO element. For instance, the present embodiments can provide a PMR write head. The PMR write head can include a magnetic pole having an STO element on top of main pole tip. The STO element can be facing an air bearing surface (ABS). The PMR write head can also include a side shield layer, with a portion of the side shield layer being disposed at the ABS. The shields can be arranged in a wide track width direction on both sides of the main pole with a metallic side gap disposed between the main pole and each side shield.

In some instances, the PMR write head can include the main pole and a trailing shield being connected via the STO element. Further, a side shield can be connected to the trailing shield. The PMR head can provide a parallel circuit for the main pole, side shield, and the trailing shield. In some instances, the STO element and main pole to side shield resistance can have a ratio (e.g., along the STO/MAC path) that is equal or less than 7.

In some embodiments, the PMR write head can include an insulation layer disposed between a side gap and the main pole, with a portion of the insulation layer disposed at the ABS. The insulation layer can include a length along the side gap or main pole with a range between 20 nm and 120 nm. The insulation layer can include a between 5 nm to 20 nm.

Many MAMR head designs may only include a conductive path from the main pole to a trailing shield via the STO element. Further, many write heads utilizing MAC may only include a conductive path from the main pole to the trailing shield, or from the main pole to the side shield. The present embodiments provide a parallel electrical path from the main pole to the trailing shield via the STO element, as well as the main pole to the side shield via a metallic side gap. Such an electrical path can increase ADC performance by both the STO element and MAC assist effect. Further, the present embodiments can provide a patterned insulation film arranged with WGEh (FIG. 3B's distance from the blue line's end to ABS) to confine a MAC current path to achieve a sufficient MAC to STO resistance ratio (For example, shorter WGEh in FIG. 3B would have higher resistance for side gap current flow compared to longer WGEh or no WGEh feature).

Figure 1B:
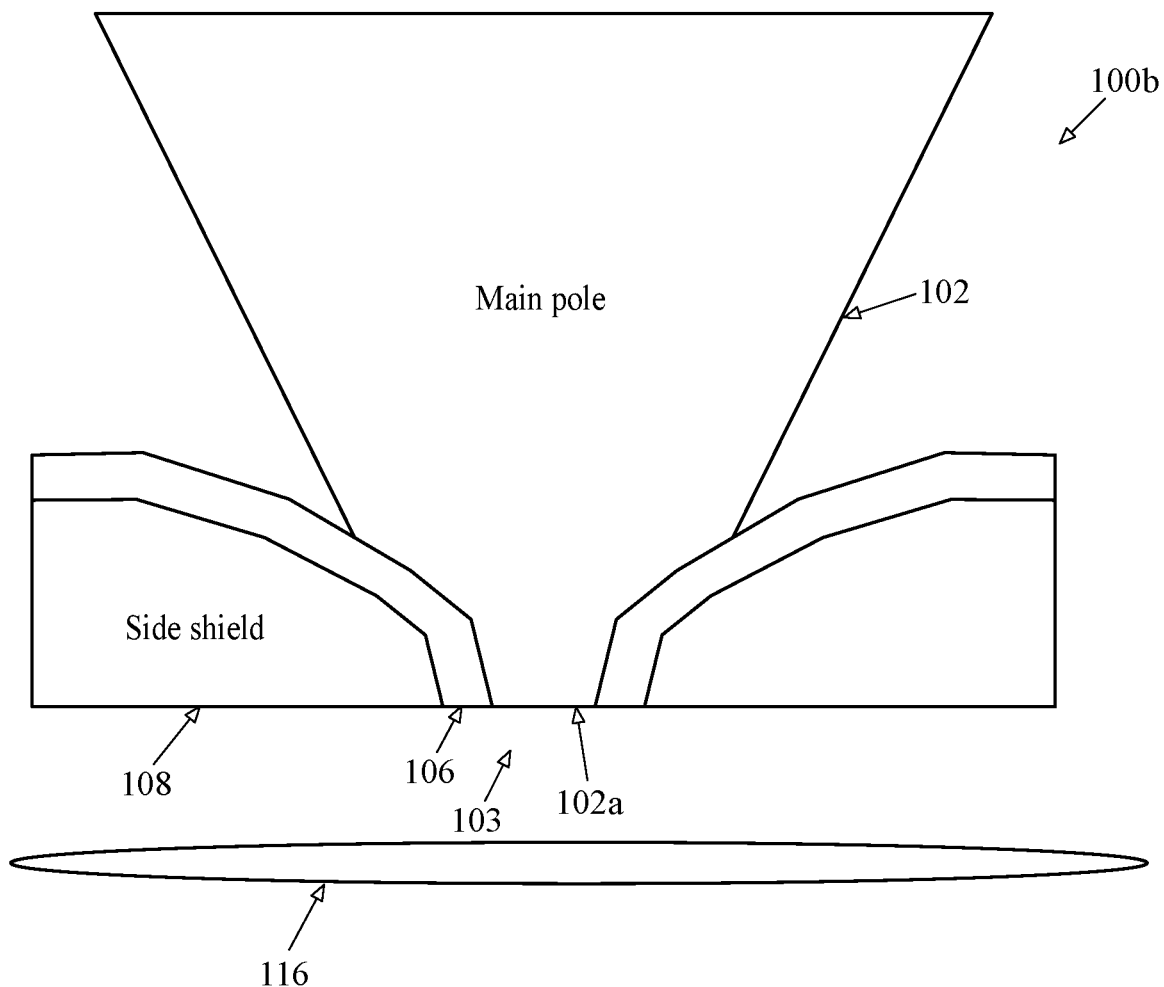
FIG. 1B illustrates a top view of a PMR head according to an embodiment.
Figure 1C:
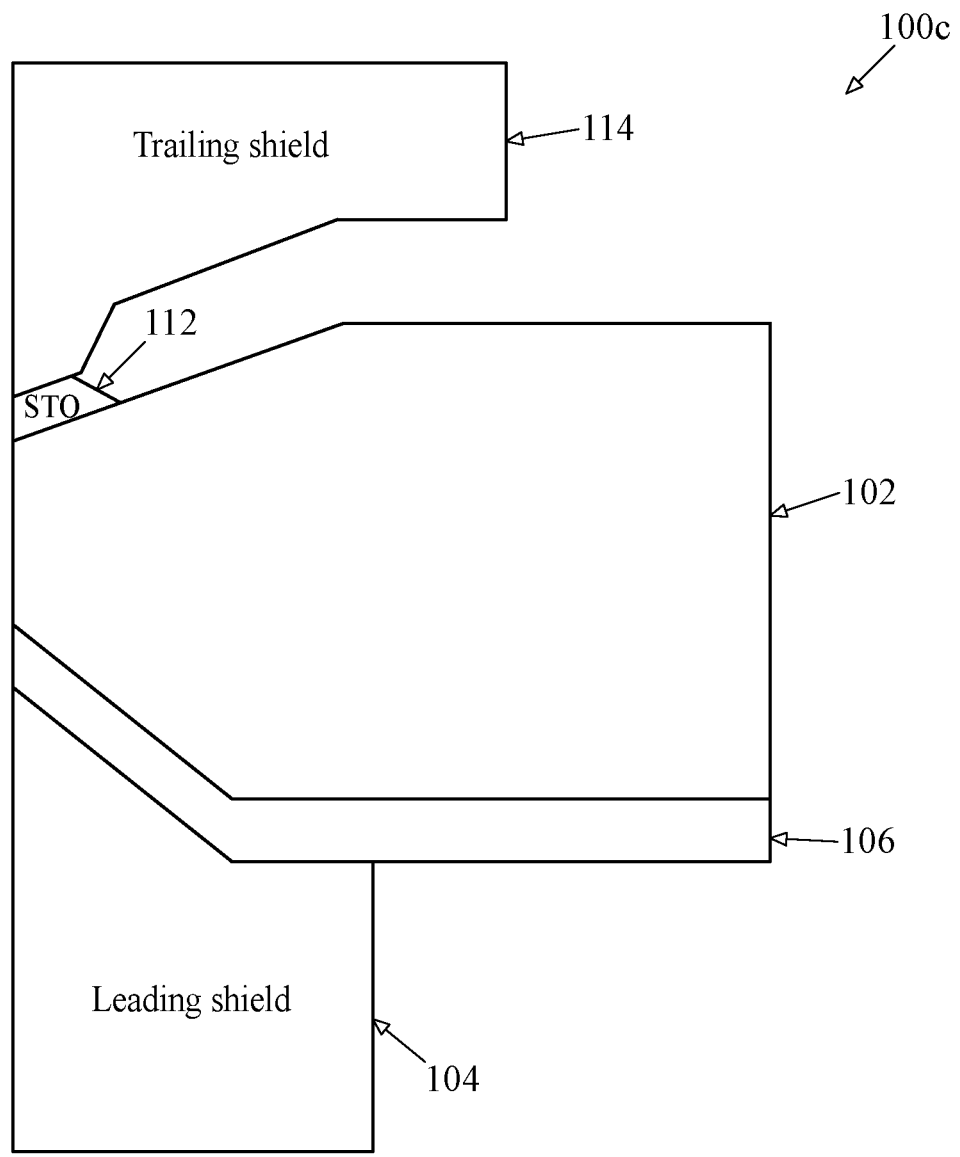
FIG. 1C illustrates a side view of a PMR head according to an embodiment.

FIG. 1A-1C illustrate PMR write heads with a STO element disposed above a main pole. FIG. 1A is a cross-section view of a PMR write head 100a. As shown in FIG. 1A, the PMR write head 100a can include a main pole 102 connected to a leading shield 104 and a side gap 106 via side shield 108. The side gap 106 can include a metallic material. The write head 100a can further include a write gap 110, with at a portion of the write gap 110 including an insulating material. The write head 100a can further include a STO element 112 disposed above the main pole 102. Further, a trailing shield 114 can be disposed above the write gap 110 and the STO element 112.

FIG. 1B illustrates a top view of a PMR head 100b. As shown in FIG. 1b, the PMR head 100b can include a side shield 108 disposed near a tip portion 102a of main pole 102. The tip portion 102a can be disposed adjacent to an ABS 103. The ABS 103 can include a surface of the PMR head 100b adjacent to the disk 116. The distance between the PMR head 100b and the disk 116 can be controlled via a dynamic fly height (DFH) writer heater, for example. A side gap 106 can be disposed between the main pole 102 and side shield 108.

FIG. 1C illustrates a side view of a PMR head 100c. As shown in FIG. 1C, the PMR head 100c can include a main pole 102 connected to a side gap 106 via a leading shield 104. Further, the STO element 112 can be disposed between the main pole 102 and a trailing shield 114.

In many instances, a width of the STO element can be equal to or less than a width of the main pole (e.g., PWA). The STO element height (e.g., SH) can be similar to or less than a width of the STO element to comprise an appropriate element aspect ratio. The STO element can be electrically connected to the main pole and trailing shield to assist the write shield using a spin torque oscillation. The STO element can include a current density more than $10^8$ A/cm$^2$ to generate the spin oscillation, which can equate to more than a 2 mA current. The STO element size may be reduced, which can result in STO element resistance ranging between 15~ 20 Ohm due to the PWA and SH design. Further, a side gap to main pole resistance can be smaller than that of STO element due to a wider contact area by metallic material at the side gap and main pole.

The PMR write head trailing shield, side shield, and main pole can be made with metallic magnetic film to conduct the electric current, which can enable to supply of electric current to the STO element. The side gap material can be made with a metallic film such as Ru, Ta, Zr, Cr, NiCr or other alloy materials. Metallic SG material can enable to supply electric current flow from the main pole to the side shield, which can be called a MAC effect. MAC effect can assist the write field by generating current magnetic field from the DC current. Main pole and side gap can be connected electrically, which can reduce electric resistance for MAC current path. A side gap to main pole resistance can be about 2 Ohm.

Figure 2A:
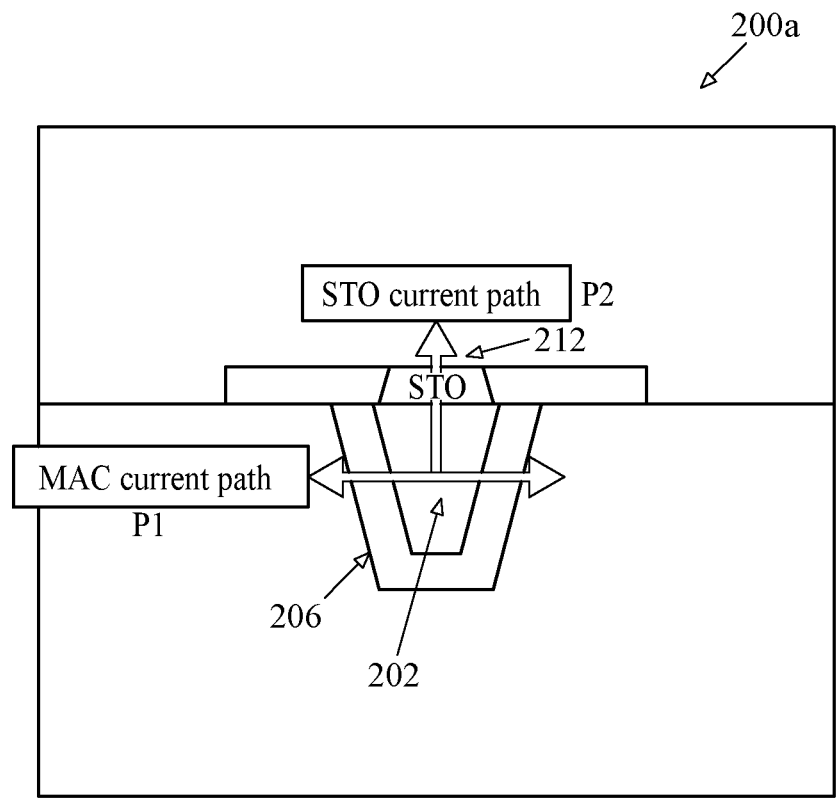
FIG. 2A is cross-section view of a PMR write head with current paths according to an embodiment.
Figure 2B:
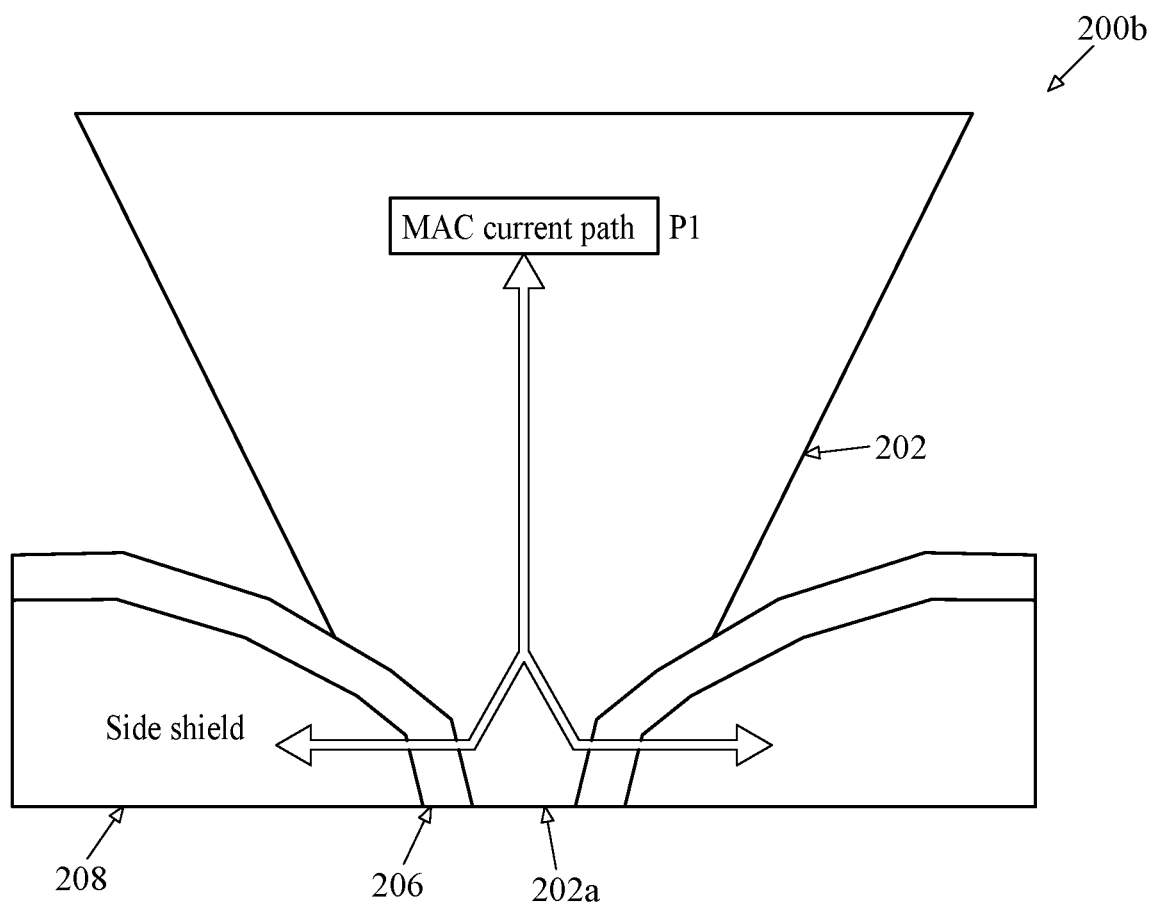
FIG. 2B illustrates a top view of a PMR head with current paths according to an embodiment.
Figure 2C:
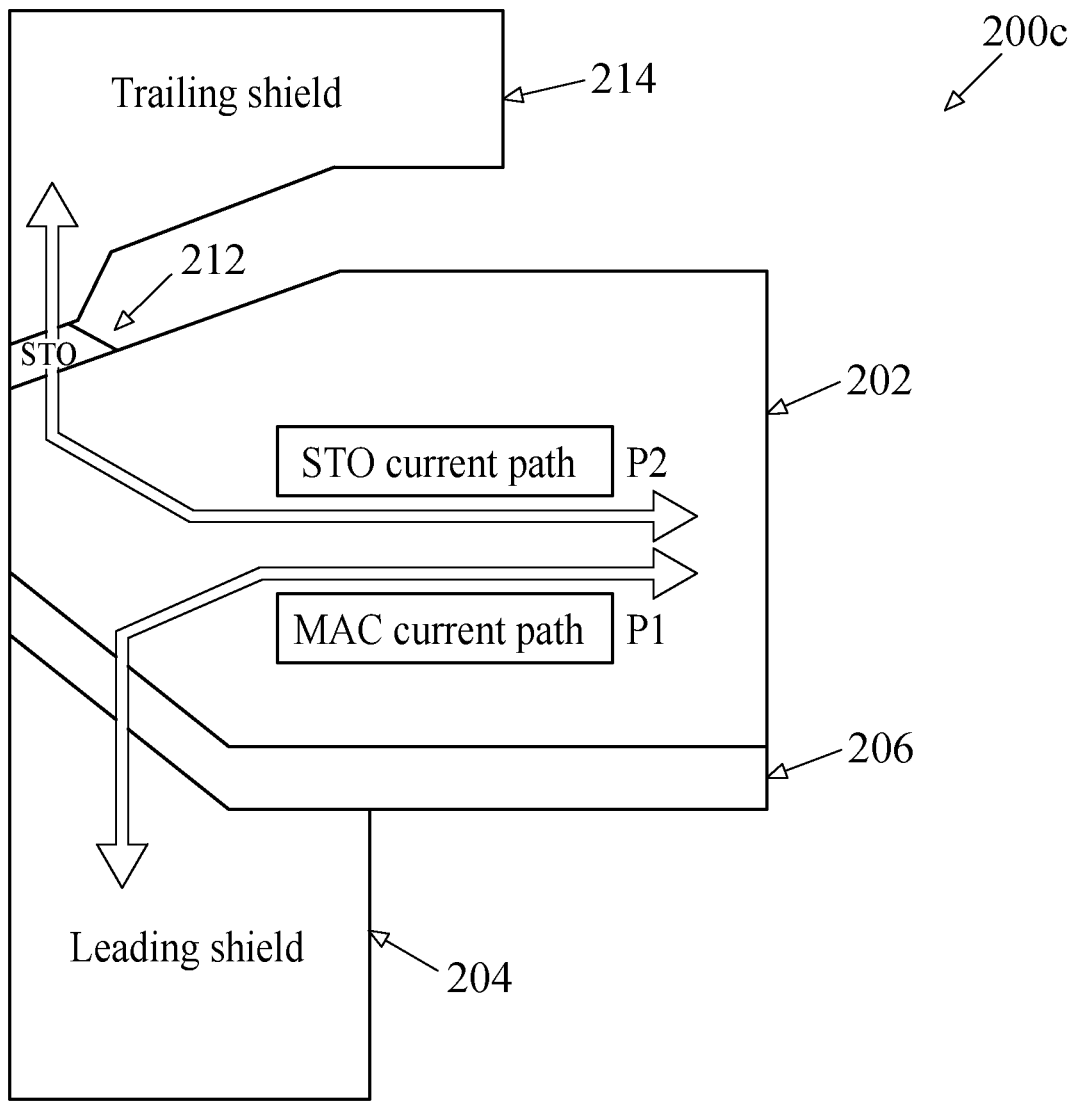
FIG. 2C illustrates a side view of a PMR head with current paths according to an embodiment.

As noted above, electrical paths can direct a current flow along a write head. FIGS. 2A-2C illustrate a PMR head illustrating current paths. As shown in FIG. 2A, a write head 200a can include a MAC current path P1 directed between the side gap 206 and main pole 202. Further, a STO current path P2 can be directed between main pole 202 and STO element 212. In FIG. 2B, the write head 200b can include a MAC current path P1 directed between a tip portion 202a of the main pole 202, the side gap 206, and a side shield 208. In FIG. 2C, a write head 200c can include a MAC current path P1 directed between main pole 202, side gap 206, and leading shield 204. Further, a STO current path P2 can be directed between main pole 202, STO element 212, and trailing shield 214.

Figure 3A:
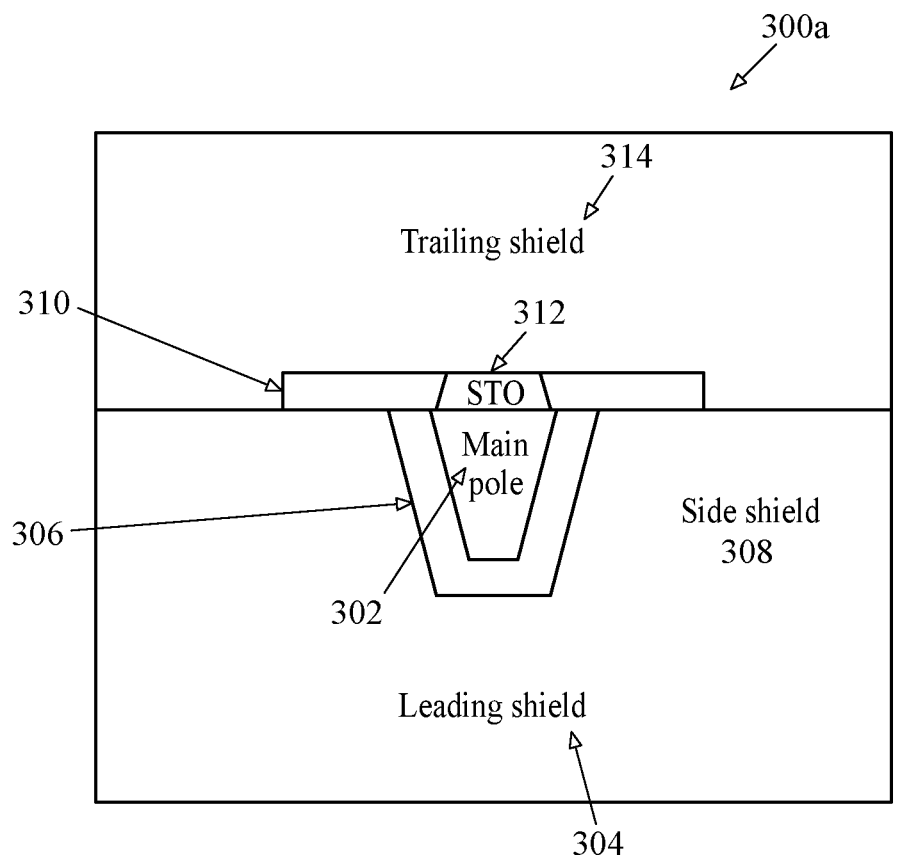
FIG. 3A is a cross-section view of a PMR head comprising an STO element and an insulation film according to an embodiment.
Figure 3B:
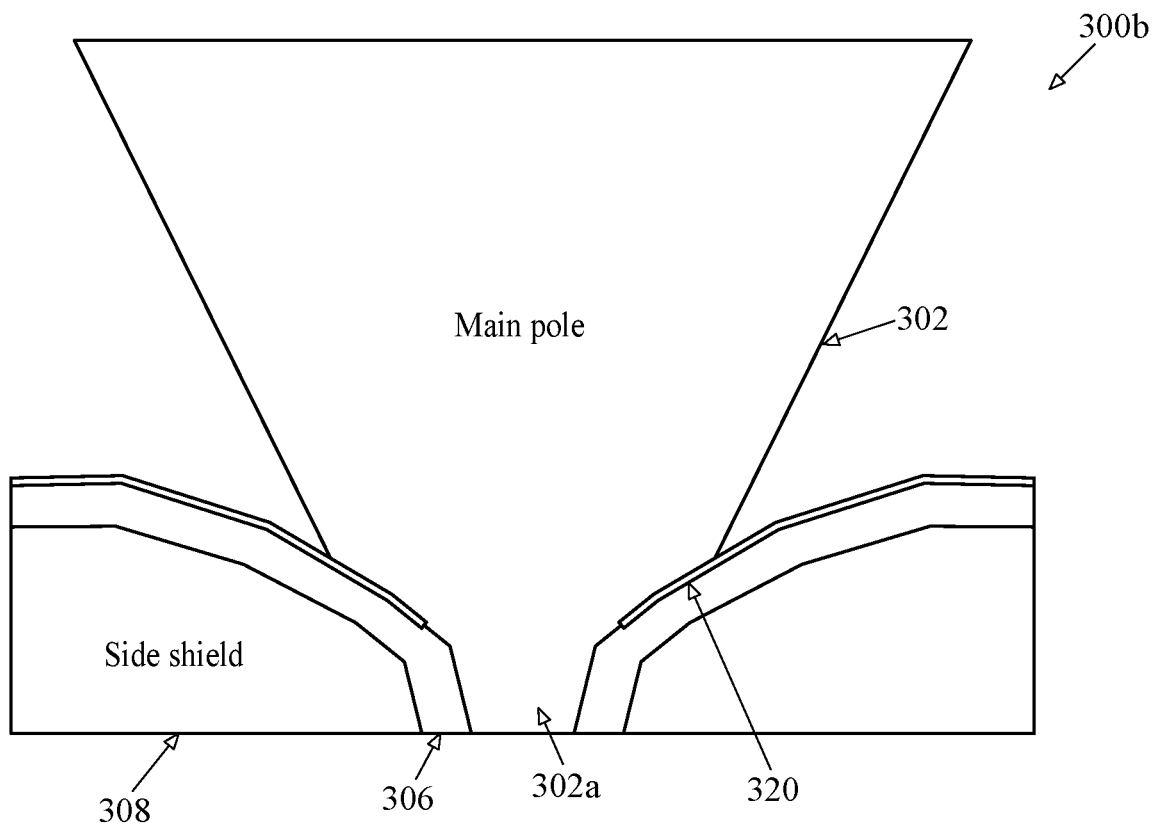
FIG. 3B is a top view of a PMR head comprising an STO element and an insulation film according to an embodiment.
Figure 3C:
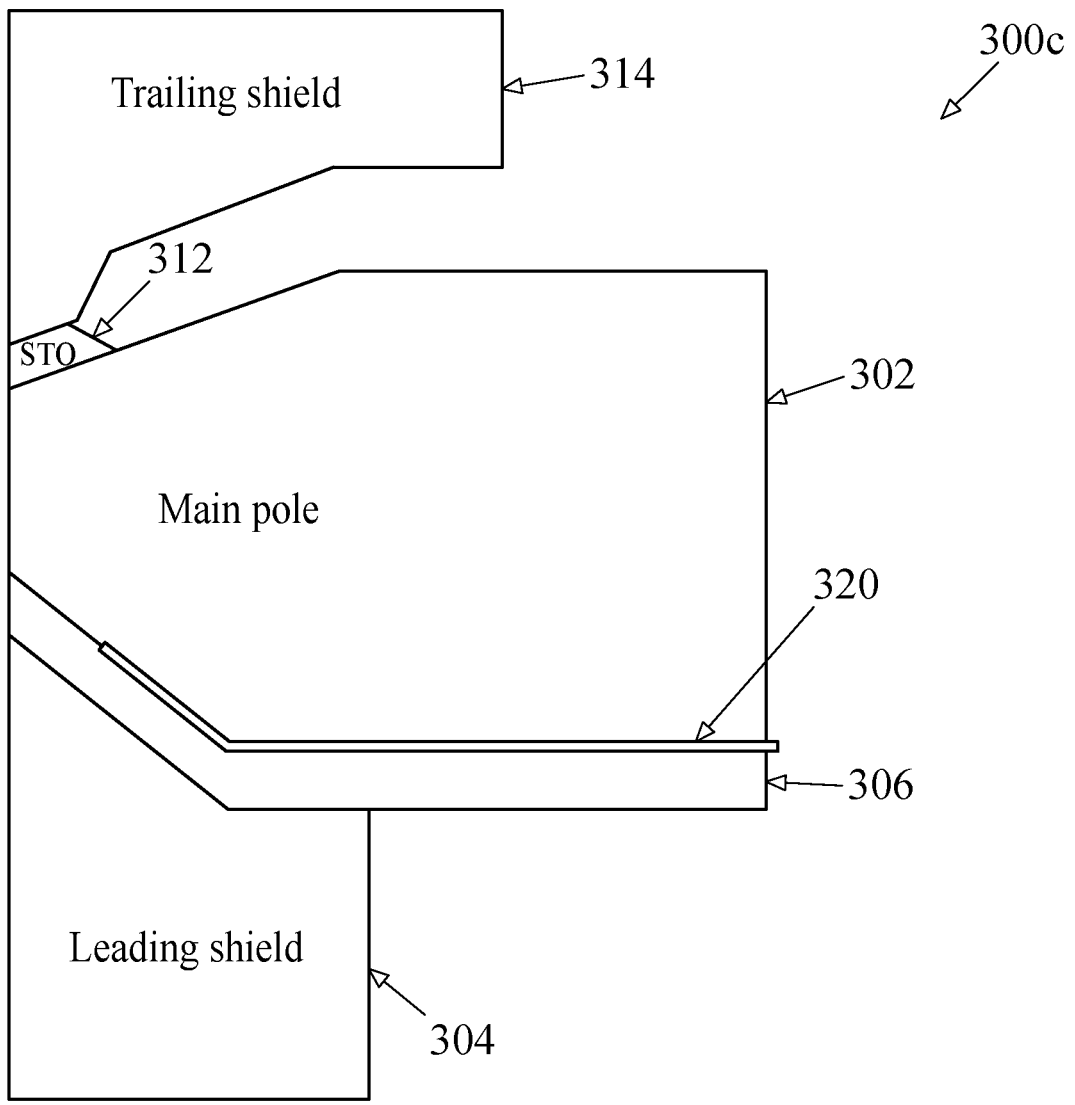
FIG. 3C is a side view of a PMR head comprising an STO element and an insulation film according to an embodiment.

FIGS. 3A-3C illustrate a PMR head equipping an STO element on the main pole with an insulation film between main pole and side gap or leading gap to confine the current path from main pole to side shield.

FIG. 3A is a cross-section view of a PMR head 300a comprising an STO element and an insulation film. As shown in FIG. 3A, the PMR head 300a can include a main pole 302 with a side shield 308 and a leading shield 304 connected to the main pole 302 via a side gap 306. The PMR head 300a can further include a write gap 310 comprising an insulation material and a STO element 312 connected to a trailing shield 314.

FIG. 3B is a top view of a PMR head 300b comprising an STO element and an insulation film. As shown in FIG. 3B, a tip portion of the main pole 302 is connected to the side shield 308 via a side gap 306. The PMR head 300b can further including an insulating material 320 disposed between the tip portion 302a of the main pole 302 and the side gap 306. The insulating material can confine a MAC current path as described herein.

FIG. 3C is a side view of a PMR head 300c comprising an STO element and an insulation film. As shown in FIG. 3C, the PMR head 300c can include the main pole 302 connected to a leading shield 304 via a side gap 306. The PMR head 300c can further include an insulating material 320 confining the MAC current path near the tip portion of the main pole 302. The PMR head 300c can further include a STO element 312 and a trailing shield 314.

In some instances, to achieve the confined MAC current path and higher MAC path resistance to balance the STO and MAC path resistance, the present embodiments can include an insulation layer between the side gap and main pole or, in some instances, the side gap and side shield. The insulation layer material can be made with a metal oxide or metal nitride material such as SiO2, Al2O3, Ta2O5, SiN, and include a thickness of less than 20 nm.

The insulation layer may not be fully elongated from the ABS, and the insulation layer can start from a height (e.g., a WGEh) from ABS to open an electric current path. In the present embodiments, the WGEh can range between 20 to 80 nm to achieve an appropriate MAC and STO resistance ratio. The WGEh can dictate MAC resistance, and the WGEh can be controlled by the MAC and STO resistance ratio.

In some embodiments, an insulation layer can be disposed between side gap and the main pole. This process can include a side shield film being fabricated using a plating and photo process. A metallic material can be deposited on the plated side shield as a side gap with a side gap length, and the insulation film can then be deposited. After depositing the insulation layer, a resist layer can be added to the composite structure of the side shield, side gap film, and insulation film by using a photo process. For example, reactive ion etching (RIE) or ion beam etching (IBE) can be used to pattern the insulation film to prevent side gap etching or erosion. After insulation film patterning, a metallic film can be deposited as a main pole plating seed layer, and the main pole film can be plated.

Figure 4A:
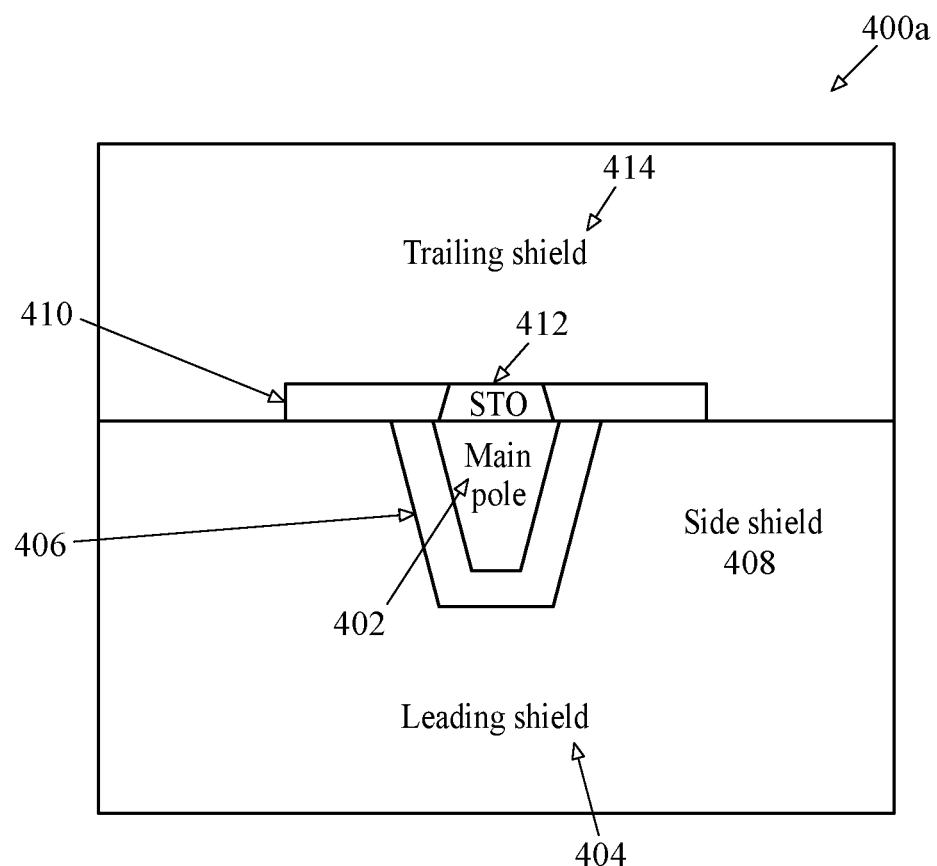
FIG. 4A is a cross-section view of a PMR head comprising an STO element and an insulation film according to an embodiment.
Figure 4B:
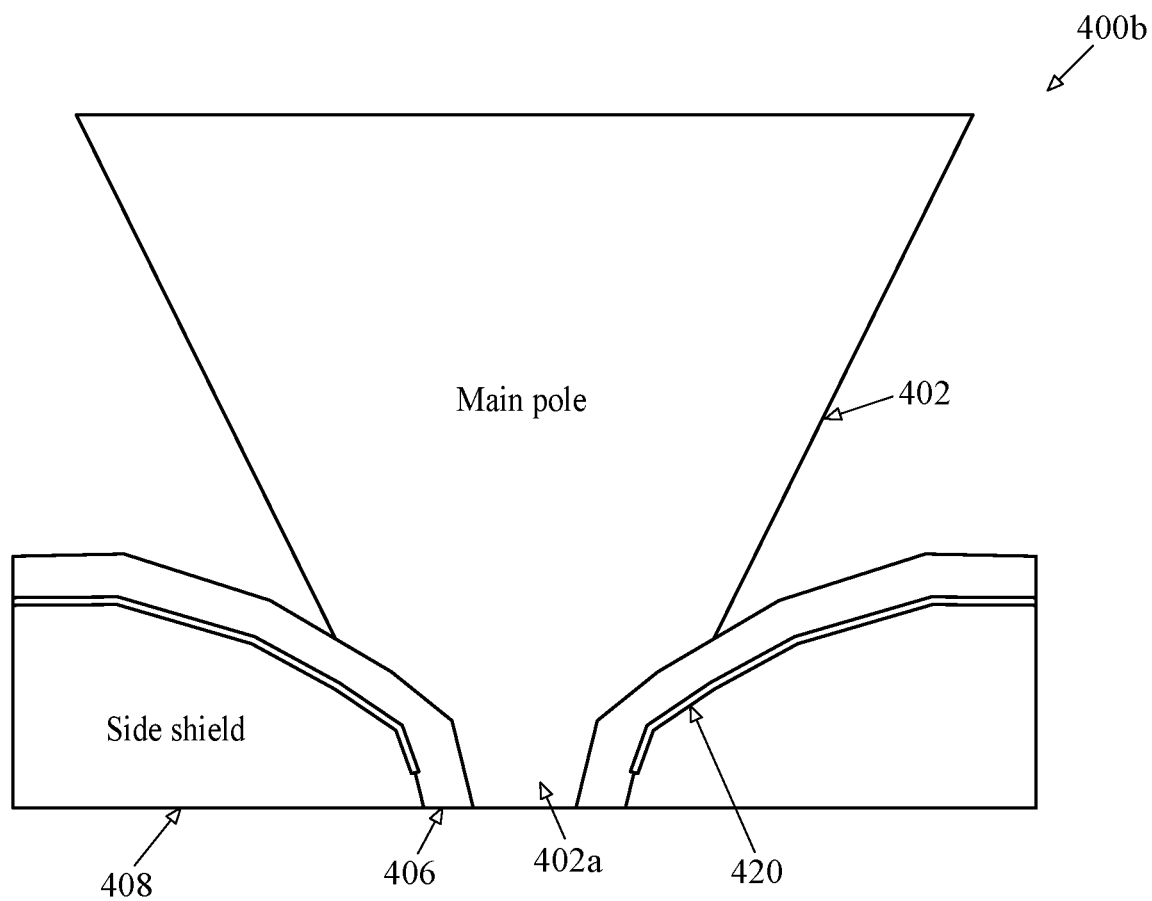
FIG. 4B is a top view of a PMR head comprising an STO element and an insulation film according to an embodiment.
Figure 4C:
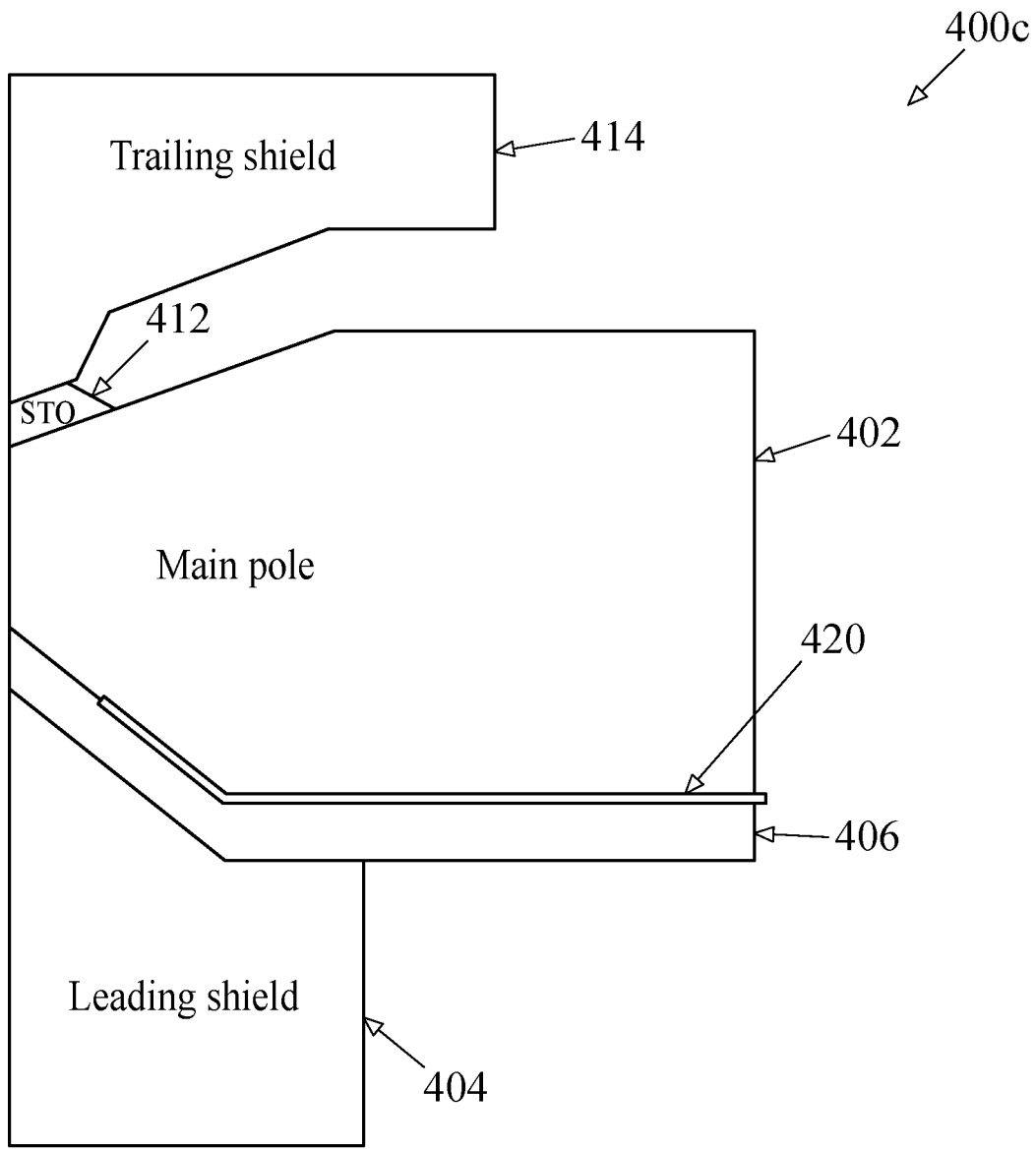
FIG. 4C is a side view of a PMR head comprising an STO element and an insulation film according to an embodiment.

FIGS. 4A-4C illustrate a PMR head with an STO element on the main pole, and an insulation film arranged between the side shield and a side gap, or between a side gap and leading shield to confine the current path from the main pole and the side shield.

FIG. 4A is a cross-section view of a PMR head 400a comprising an STO element and an insulation film. As shown in FIG. 4A, the PMR head 400a can include a main pole 402 with a side shield 408 and a leading shield 404 connected to the main pole 402 via a side gap 406. The PMR head 400a can further include a write gap 410 comprising an insulation material and a STO element 412 connected to a trailing shield 414.

FIG. 4B is a top view of a PMR head 400b comprising an STO element and an insulation film. As shown in FIG. 4B, a tip portion 402a of the main pole 402 is connected to the side shield 408 via a side gap 406. The PMR head 400b can further including an insulating material 420 disposed between the side shield 408 and the side gap 406. The insulating material can confine a MAC current path as described herein.

FIG. 4C is a side view of a PMR head 400c comprising an STO element and an insulation film. As shown in FIG. 4C, the PMR head 400c can include the main pole 402 connected to a leading shield 404 via a side gap 406. The PMR head 400c can further include an insulating material 420 confining the MAC current path disposed between the side gap 406 and a portion of the leading shield 404. The PMR head 400c can further include a STO element 412 and a trailing shield 414.

In some instances, a side shield film can be fabricated with a plating and photo process. Further, an insulation film can be deposited on the plated side shield. After depositing the insulation layer, a resist layer can be added on a composite structure of the side shield, side gap film, and insulation film using a photo process. For instance, any of RIE or IBE can be used to pattern the insulation film to prevent side shield etching or erosion. The metallic material can be deposited on the plated side shield as a side gap with a targeted side gap length. After side gap deposition, another metallic film can be deposited as a main pole plating seed layer, and the main pole film can be plated.

In some embodiments, both a STO and MAC current path can be implemented to obtain an appropriate electric current by balancing the electric resistance of STO and MAC path. This can increase the ADC by both assist effect from STO and MAC. The WGEh can confine the MAC current and increase MAC resistance, which can prevent kTPI loss and supply enough current to the STO element.

Figure 5A:
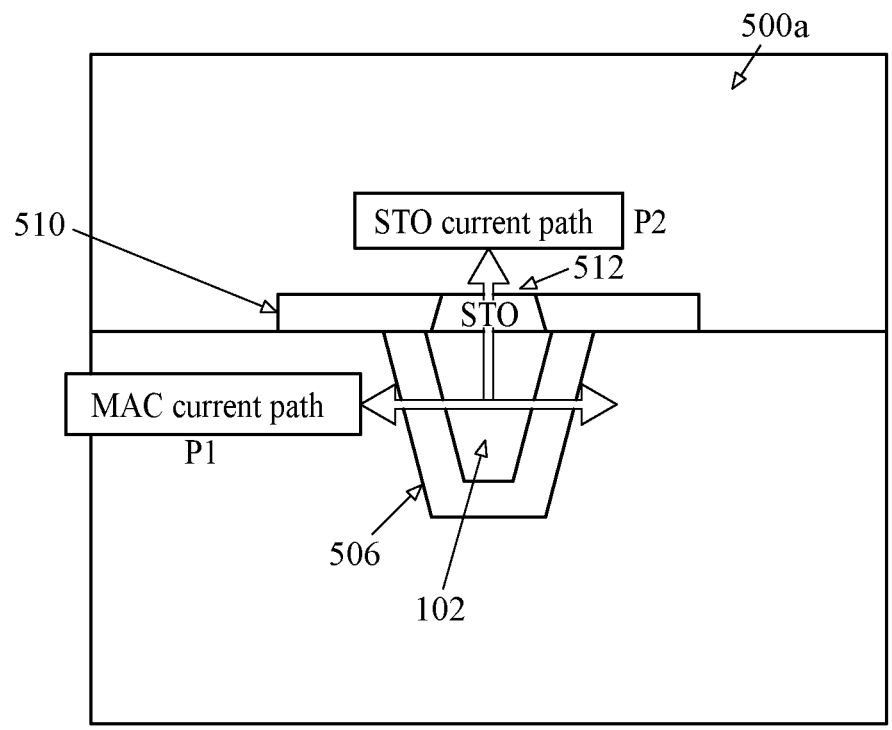
FIG. 5A is a cross-section view of a PMR head comprising an STO element and an insulation film with current paths according to an embodiment.
Figure 5B:
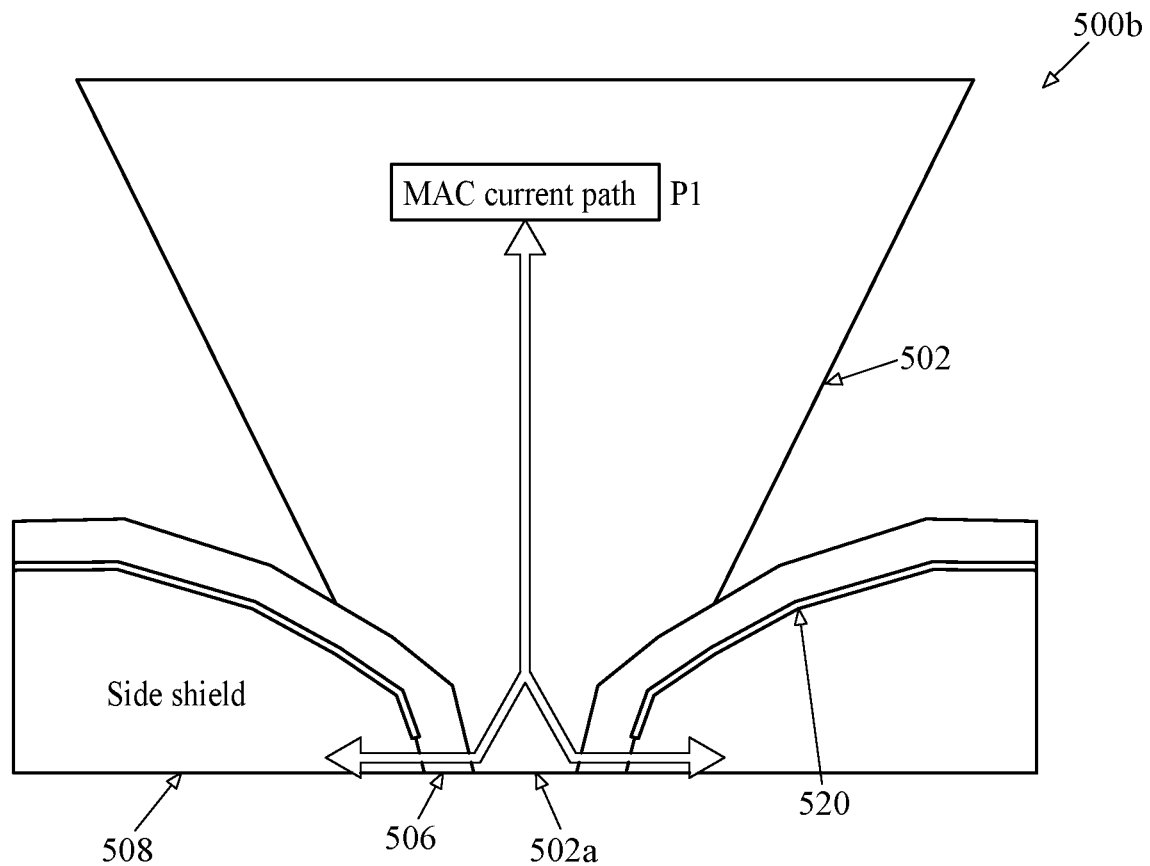
FIG. 5B is a top view of a PMR head comprising an STO element and an insulation film with current paths according to an embodiment.
Figure 5C:
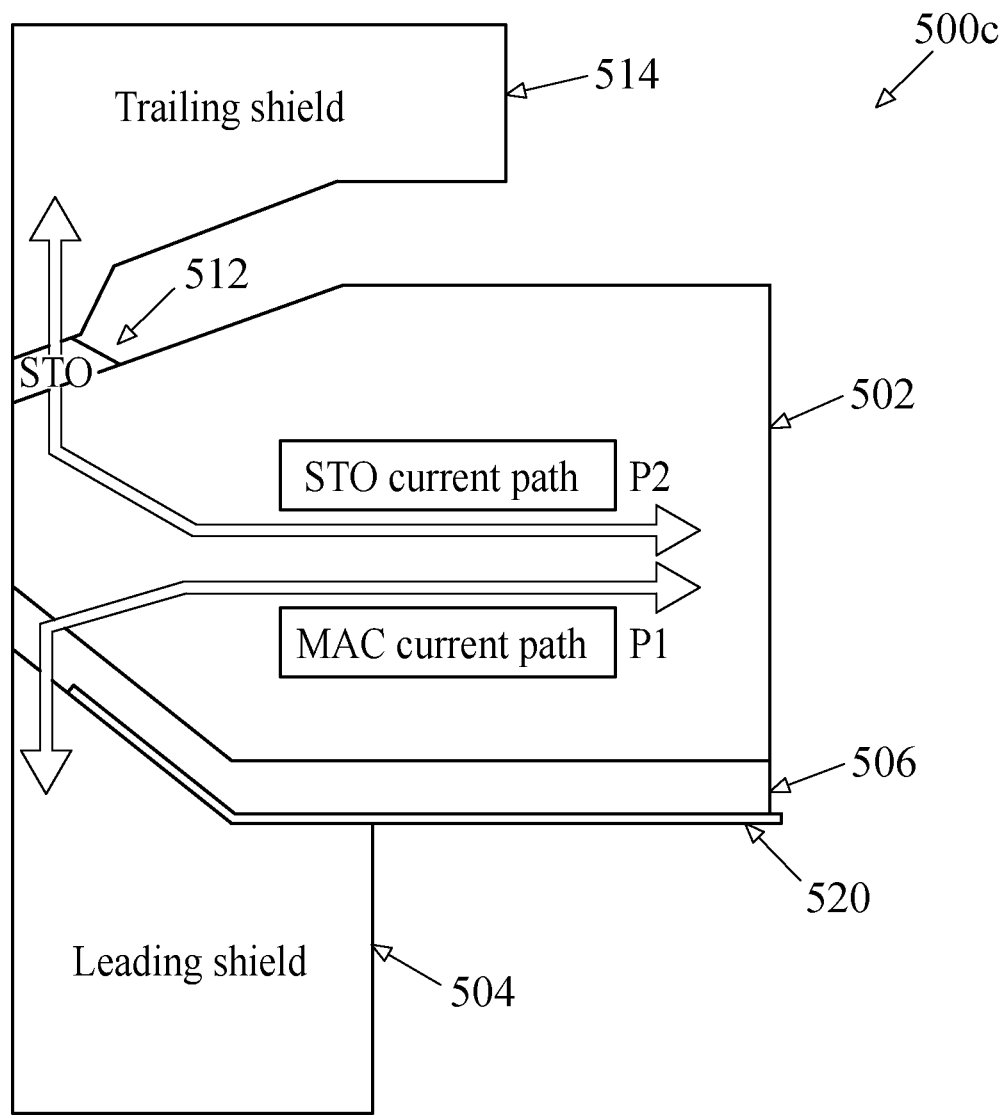
FIG. 5C is a side view of a PMR head comprising an STO element and an insulation film with current paths according to an embodiment.

FIGS. 5A-5C illustrate current paths of a PMR head. As shown in FIG. 5A, a write head 500a can include a MAC current path P1 directed between the side gap 506 and main pole 502. Further, a STO current path P2 can be directed between main pole 502 and STO element 512. In FIG. 5B, the write head 500b can include a MAC current path P1 directed between a tip portion 502a of the main pole 502, the side gap 506, and a side shield 508. The current path P1 can be directed around a portion of the side gap 506 in which the insulating layer 520 ends. In FIG. 5C, a write head 500c can include a MAC current path P1 directed between main pole 502, side gap 506, and leading shield 504. The current path P1 can be directed around the insulating layer 520. Further, a STO current path P2 can be directed between main pole 502, STO element 512, and trailing shield 514.

Figure 6:
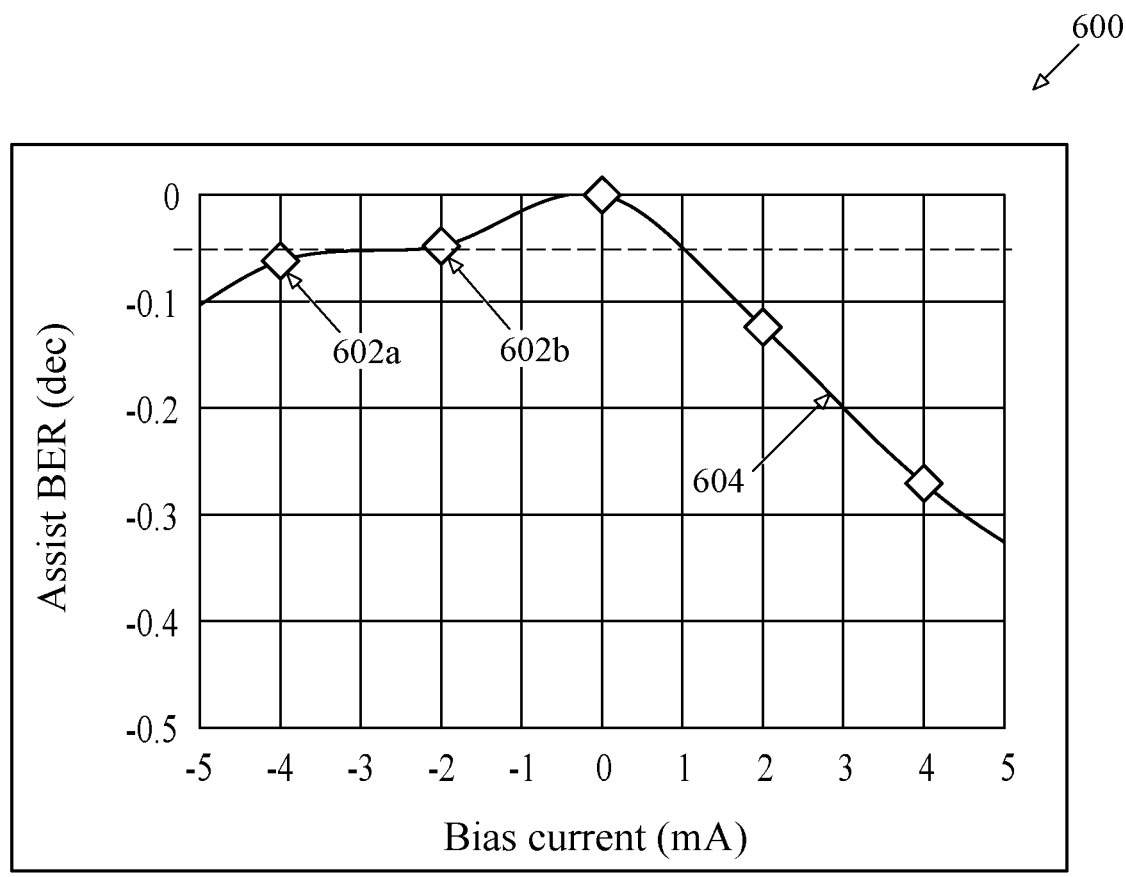
FIG. 6 is a graphical representation of an example bit error rate (BER) assist gain by a bias current of the STO element according to an embodiment.

FIG. 6 is a graphical representation 600 of an example bit error rate (BER) assist gain by a bias current of the STO element. As shown in FIG. 6, multiple points (e.g., 602a, 602b) can be represented based on a bias current (in milliamps (mA)) and an assist BER. Further, a trendline 604 can be added between points in the graphical representation 600.

FIG. 6 represents the BER change of a bias current for STO oscillation with a size of the STO element comprising a 60 nm width and 30 nm height. STO element resistance is designed 15 Ohm. 1 mA or higher assist current can be used to obtain BER gain over other assist effects such as current field or element protrusion by joule heating indicated in the negative current polarity.

Figure 7:
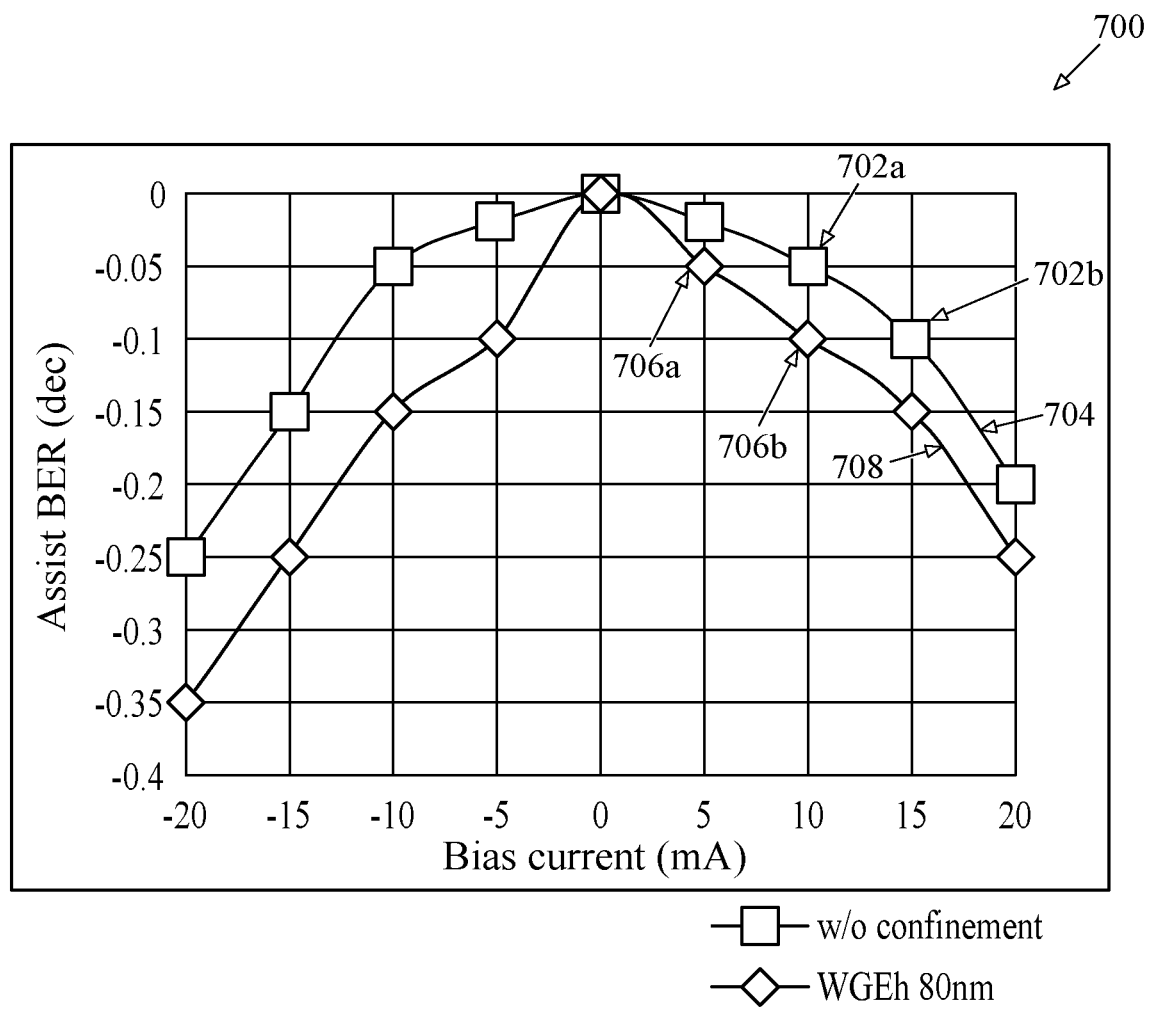
FIG. 7 is a graphical representation of an example BER assist gain by a bias current of MAC according to an embodiment.

FIG. 7 is a graphical representation 700 of an example BER assist gain by a bias current of MAC. As shown in FIG. 7, a first series of points (e.g., 702a, 702b) can be provided with a trendeline 704 between points representing a BER assist gain without a MAC current confinement. Further, a second series of points (e.g., 706a, 706b) can be provided with trendline 708 between points representing a BER assist gtain with a WGEh of 80 nm.

FIG. 7 can represent a MAC assist BER to assist gain by different bias currents. Without a MAC current confinement, the assist gain can be smaller than with MAC current confinement of WGEh 80 nm. For example, a WGEh of 80 nm can achieve a STO to MAC resistance ratio of 3.1 and corresponding STO resistance of 15 Ohm and a MAC path resistance of 4.8 Ohm. In case of the confined MAC current path, a 7 mA or higher bias condition can provide a significant BER assist gain over a bias-off state.

Figure 8:
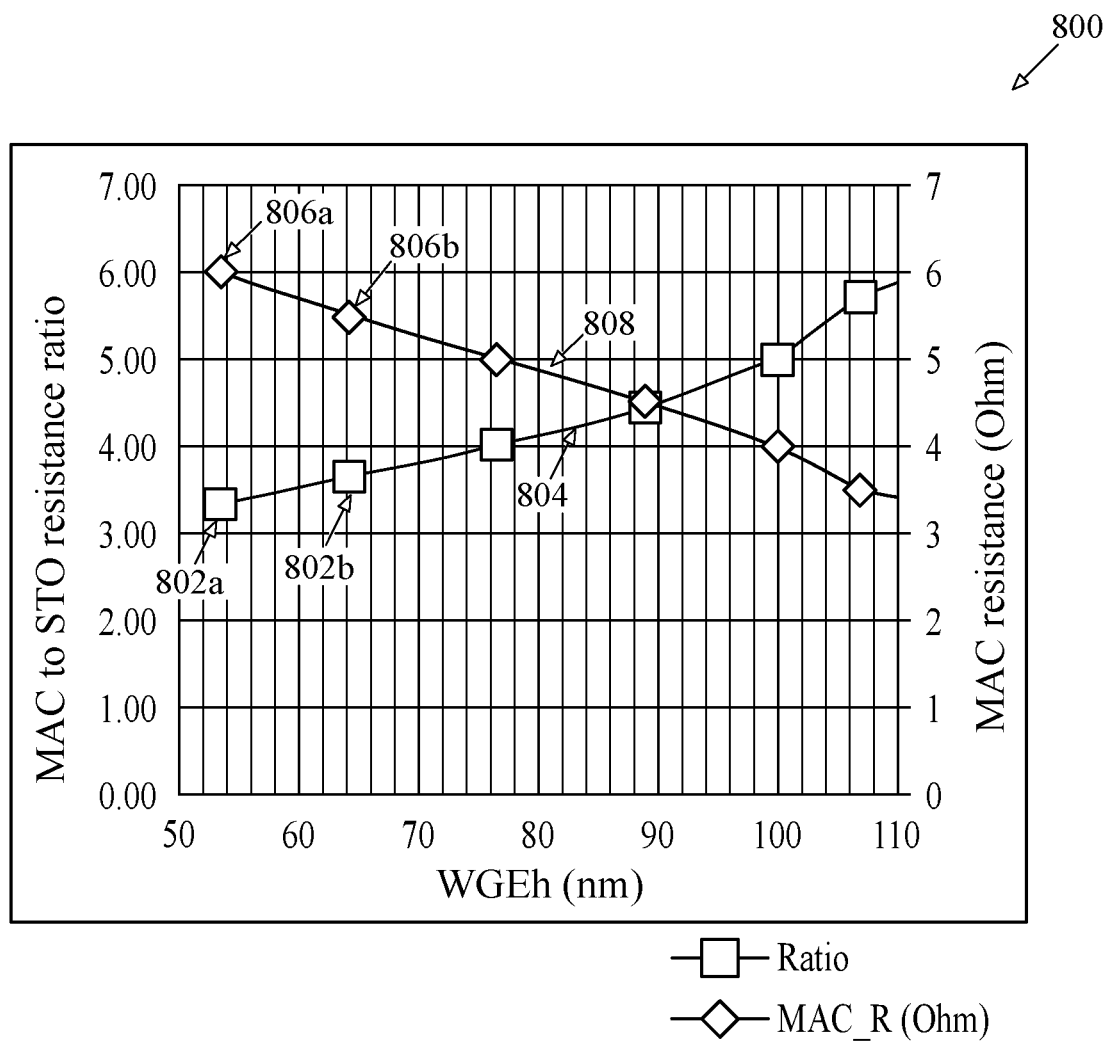
FIG. 8 is a graphical representation of a relation between a WGEh and a MAC-STO resistance ratio, and a WGEh and MAC resistance according to an embodiment.

FIG. 8 is a graphical representation 800 of a relation between a WGEh and a MAC-STO resistance ratio, and a WGEh and MAC resistance. As shown in FIG. 8, a first series of points (e.g., 802a, 802b) can provide a ratio with trendline 804 connecting points (e.g., 802a, 802b). Further, a second series of points (e.g., 806a, 806b) can provide a MAC resistance (in Ohms) with a trendline 808 connecting points (e.g., 806a, 806b). FIG. 8 can show a relation between a WGEh and MAC path to a STO resistance ratio, and a MAC (side shield-MP) resistance. The WGEh can specify a contact area between the main pole and the side gap or side shield, and MAC resistance can increase with a shorter WGEh.

Figure 9:
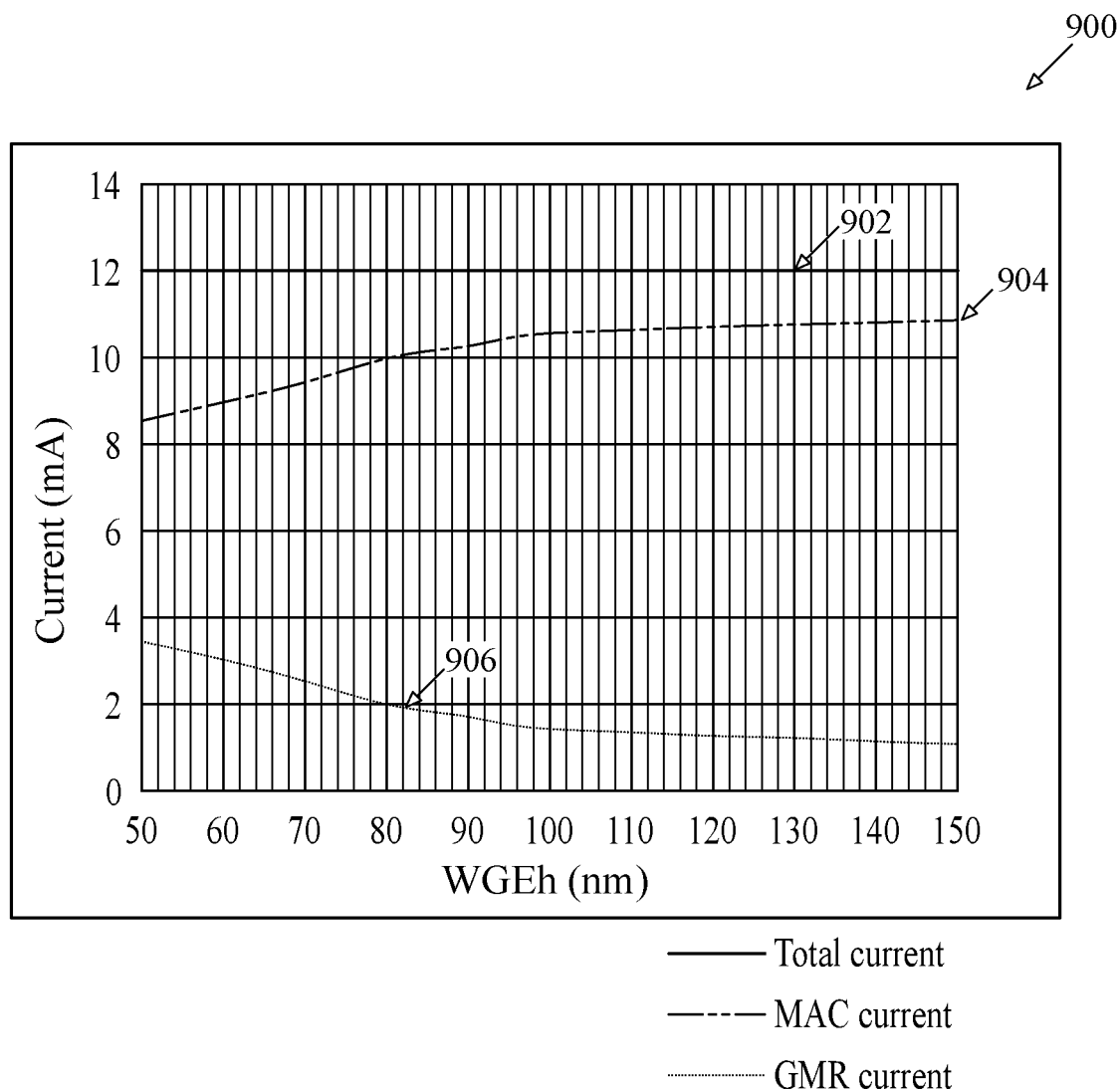
FIG. 9 is a graphical representation of a MAC and STO current change by a WGEh according to an embodiment.

FIG. 9 is a graphical representation 900 of a MAC and STO current change by a WGEh. As shown in FIG. 9, a first line 902 can represent a total current in relation to a WGEh (in nm) and a current (in mA). Further, a second line 904 can represent a MAC current, and a third line 906 can represent a GMR (Giant-Magneto Resistive) current. Further, FIG. 9 can show the current change by WGEh at a total input current of 12 mA. The STO element resistance can be around 15 Ohms, and MAC path resistance can change by WGEh (e.g., as shown in FIG. 6). STO current flow can decrease by increasing WGEh due to a main pole and side gap contact area increment. A WGEh smaller than 100 nm can obtain a STO current higher than 1 mA, but MAC path current may still be higher than 10 mA. A higher STO current can be preferred to obtain the larger assist gain by stronger spin torque oscillation, and a small WGEh can increase a STO current due to a higher MAC path resistance. Further, a higher MAC path current can also obtain a stronger assist gain.

Table 1 below illustrates a write field Hy change by a WGE thickness and a WHEh.

TABLE 1

| WGE thickness | WGEh | Hy (Oe) |
| --- | --- | --- |
| 10 nm | No WGE | 7913.92 |
|  | 25 nm | 7805.88 |
|  | 55 nm | 7862.82 |
|  | 80 nm | 7890.20 |
|  | 100 nm | 7926.93 |
| 20 nm | No WGE | 7913.92 |
|  | 25 nm | 7585.12 |
|  | 55 nm | 7708.09 |
|  | 80 nm | 7787.78 |
|  | 100 nm | 7846.24 |

Table 1 provides an example simulation result of the write field change by WGEh and insulation film thickness. A 10 nm insulation film thickness may not impact the writer performance significantly by changing a WGEh. On the contrary, a 20 nm insulation film thickness can impact the writer performance significantly despite a longer WGEh. A thicker insulation film and short WGEh can influence a main pole shape close to the ABS, and it can degrade the write ability because of the main pole volume reduction. This result can show that insulation film thickness may be less than 20 nm to sustain the writer performance.

A first example embodiment describes a perpendicular magnetic recording (PMR) write head. The PMR write head can include a main pole (e.g., 102) comprising a tip portion (e.g., 102a) disposed adjacent to an air bearing surface (ABS) (e.g., 103) and is configured to interact with a magnetic recording medium (e.g., 116). For example, the main pole can modify a magnetization of the disk to write digital data to the disk.

The PMR write head can also include a spin torque oscillator (STO) element (e.g., 112) disposed adjacent to the main pole. The STO element (e.g., 112) can emit a microwave field using spin torque oscillation. The STO element can be disposed above the tip portion of the main pole, and a portion of the STO element can be disposed adjacent to the ABS.

The PMR write head can also include a side shield layer (e.g., 108) with a portion of the side shield layer disposed adjacent to the ABS. The PMR write head can also include a metallic side gap layer (e.g., 106) disposed between the main pole (e.g., 102) and the side shield layer (e.g., 108).

In some instances, the PMR write head can include a trailing shield (e.g., 114) connected to the STO element. The STO element can electrically connect the trailing shield to the main pole.

In some embodiments, the side shield is connected to the trailing shield. The main pole, the side shield, and the trailing shield can form a parallel electrical circuit directing an electrical path (e.g., P1) between the main pole, the side shield, and the trailing shield.

In some embodiments, a resistance ratio between the STO element and main pole, and from the main pole to side shield can be equal to or less than 7.

In some embodiments, the PMR write head can include an insulation layer (e.g., 320) disposed between the metallic side gap layer (e.g., 306) and the main pole (e.g., 302), wherein the main pole and the metallic side gap layer are in direct contact only at the tip portion (302a) of the main pole.

In some embodiments, the PMR write head can include an insulation layer (e.g., 420) disposed between side shield (e.g., 408) and the metallic side gap layer (e.g., 406). The insulation layer can direct electrical current at the tip portion of the main pole. The insulation layer can be disposed between 20 and 120 nanometers from the ABS. The insulation layer can include a thickness between 5 and 20 nanometers.

In another example embodiment, a write head is described. The write head can include a main pole comprising a tip portion disposed adjacent to an air bearing surface (ABS) and is configured to interact with a magnetic recording medium. The write head can also include a spin torque oscillator (STO) element disposed adjacent to the main pole. A portion of the STO element can be disposed adjacent to the ABS. The write head can also include a side shield layer with a portion of the side shield layer disposed adjacent to the ABS. The write head can also include a metallic side gap layer disposed between the main pole and the side shield layer. The write head can also include an insulation layer disposed between the metallic side gap layer and the main pole.

In some instances, the main pole and the metallic side gap layer are in direct contact only at the tip portion of the main pole.

In some embodiments, the insulation layer is disposed between 20 and 120 nanometers from the ABS.

In some embodiments, the write head can include a trailing shield connected to the STO element. The STO element can electrically connect the trailing shield to the main pole.

In some instances, the side shield is connected to the trailing shield, and the main pole, the side shield, and the trailing shield can form a parallel electrical circuit directing an electrical path (e.g., P1) between the main pole, the side shield, and the trailing shield. In some instances, the STO element is configured to emit a microwave field by spin torque oscillation, wherein a combination of the microwave field along a second path (e.g., P2) and an electrical flow directed along the electrical path (e.g., P1) can increase magnetization switching of the magnetic recording medium by the write head.

In another example embodiment, a system is described. The system can include a main pole comprising a tip portion disposed adjacent to an air bearing surface (ABS) and is configured to interact with a magnetic recording medium. The system can also include a spin torque oscillator (STO) element disposed adjacent to the main pole, wherein a portion of the STO element is disposed adjacent to the ABS. The system can also include a side shield layer with a portion of the side shield layer disposed adjacent to the ABS. The system can also include a metallic side gap layer disposed between the main pole and the side shield layer. The system can also include an insulation layer disposed between the metallic side gap layer and the side shield layer, wherein only a portion of the metallic side gap layer is in direct contact with the side shield layer.

In some embodiments, the insulation layer is disposed between 20 and 120 nanometers from the ABS.

In some embodiments, the system can include a trailing shield connected to the STO element. The STO element can electrically connect the trailing shield to the main pole.

In some embodiments, the side shield can be connected to the trailing shield, and the main pole, the side shield, and the trailing shield can form a parallel electrical circuit directing an electrical path between the main pole, the side shield, and the trailing shield.

In some embodiments, the insulation layer comprises a thickness between 5 and 20 nanometers.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A perpendicular magnetic recording (PMR) write head comprising:
   a main pole comprising a tip portion disposed adjacent to an air bearing surface (ABS) and is configured to interact with a magnetic recording medium;
   a spin torque oscillator (STO) element disposed adjacent to the main pole;
   a side shield layer with a portion of the side shield layer disposed adjacent to the ABS;
   a trailing shield connected to the STO element, wherein the STO element electrically connects the trailing shield to the main pole, wherein the side shield layer is connected to the trailing shield, and wherein the main pole, the side shield layer, and the trailing shield form a parallel electrical circuit directing an electrical path between the main pole, the side shield layer, and the trailing shield; and
   a metallic side gap layer disposed between the main pole and the side shield layer.

2. The PMR write head of claim 1, wherein the STO element is disposed above the tip portion of the main pole, and a portion of the STO element is disposed adjacent to the ABS.

3. The PMR write head of claim 1, wherein resistance ratio between the STO element and the main pole, and from the main pole to side shield layer is equal to or less than 7.

4. The PMR write head of claim 1, further comprising:
   an insulation layer disposed between the metallic side gap layer and the main pole, wherein the main pole and the metallic side gap layer are in direct contact only at the tip portion of the main pole.

5. The PMR write head of claim 4, wherein the insulation layer is disposed between 20 and 120 nanometers from the ABS.

6. The PMR write head of claim 4, wherein the insulation layer comprises a thickness between 5 and 20 nanometers.

7. The PMR write head of claim 1, further comprising:
   an insulation layer disposed between side shield layer and the metallic side gap layer.

8. A write head comprising:
   a main pole comprising a tip portion disposed adjacent to an air bearing surface (ABS) and is configured to interact with a magnetic recording medium;
   a spin torque oscillator (STO) element disposed adjacent to the main pole, wherein a portion of the STO element is disposed adjacent to the ABS;
   a trailing shield connected to the STO element, wherein the STO element electrically connects the trailing shield to the main pole;
   a side shield layer with a portion of the side shield layer disposed adjacent to the ABS;
   a metallic side gap layer disposed between the main pole and the side shield layer; and
   an insulation layer disposed between the metallic side gap layer and the main pole.

9. The write head of claim 8, wherein the main pole and the metallic side gap layer are in direct contact only at the tip portion of the main pole.

10. The write head of claim 9, wherein the insulation layer is disposed between 20 and 120 nanometers from the ABS.

11. The write head of claim 8, wherein the side shield layer is connected to the trailing shield, and wherein the main pole, the side shield layer, and the trailing shield form a parallel electrical circuit directing an electrical path between the main pole, the side shield layer, and the trailing shield.

12. The write head of claim 11, wherein the STO element is configured to emit a microwave field by spin torque oscillation, wherein a combination of the microwave field and an electrical flow directed along the electrical path increases magnetization switching of the magnetic recording medium by the write head.

* * * * *